US009600360B2

(12) United States Patent
Fee et al.

(10) Patent No.: US 9,600,360 B2
(45) Date of Patent: Mar. 21, 2017

(54) DYNAMIC PARTIAL BLOCKING OF A CACHE ECC BYPASS

(71) Applicant: International Business Machines Corporation, Armonk, NY (US)

(72) Inventors: Michael F. Fee, Cold Spring, NY (US); Pak-kin Mak, Poughkeepsie, NY (US); Arthur J. O'Neill, Jr., Poughkeepsie, NY (US); Deanna Postles Dunn Berger, Hyde Park, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 176 days.

(21) Appl. No.: 14/549,575

(22) Filed: Nov. 21, 2014

(65) Prior Publication Data

US 2016/0147664 A1    May 26, 2016

(51) Int. Cl.
*G06F 11/10* (2006.01)
*G06F 12/08* (2016.01)

(52) U.S. Cl.
CPC ...... *G06F 11/1064* (2013.01); *G06F 12/0848* (2013.01); *G06F 12/0862* (2013.01); *G06F 12/0864* (2013.01); *G06F 12/0888* (2013.01); *G06F 2212/1032* (2013.01); *G06F 2212/282* (2013.01); *G06F 2212/602* (2013.01); *G06F 2212/603* (2013.01); *G06F 2212/6032* (2013.04); *G06F 2212/6046* (2013.01)

(58) Field of Classification Search
CPC ............. G06F 11/1064; G06F 12/0848; G06F 12/0862; G06F 12/0888
See application file for complete search history.

(56) References Cited

U.S. PATENT DOCUMENTS 6,212,631 B1 * 4/2001 Springer ............. G06F 12/0802
711/E12.017
6,654,925 B1   11/2003 Meaney et al.
(Continued)

OTHER PUBLICATIONS

List of IBM Patents or Patent Applications Treated As Related (Appendix P), Filed Aug. 12, 2015, 2 pages.
(Continued)

*Primary Examiner* — Ryan Bertram
(74) *Attorney, Agent, or Firm* — Cantor Colburn LLP; Steven Chiu (57) ABSTRACT

An aspect includes receiving a fetch request for a data block at a cache memory system that includes cache memory that is partitioned into a plurality of cache data ways including a cache data way that contains the data block. The data block is fetched and it is determined whether the in-line ECC checking and correcting should be bypassed. The determining is based on a bypass indicator corresponding to the cache data way. Based on determining that in-line ECC checking and correcting should be bypassed, returning the fetched data block to the requestor and performing an ECC process for the fetched data block subsequent to returning the fetched data block to the requestor. Based on determining that in-line ECC checking and correcting should not be bypassed, performing the ECC process for the fetched data block and returning the fetched data block to the requestor subsequent to performing the ECC process.

11 Claims, 4 Drawing Sheets

(56) References Cited

U.S. PATENT DOCUMENTS

| | | | |
|---|---|---|---|
| 7,120,836 B1 | 10/2006 | Englin et al. | |
| 8,112,693 B2* | 2/2012 | Kong | G06F 11/1072 |
| | | | 714/764 |
| 8,117,395 B1* | 2/2012 | Rohana | G06F 12/0864 |
| | | | 711/128 |
| 8,266,498 B2* | 9/2012 | Moyer | G06F 11/1064 |
| | | | 714/758 |
| 2014/0143612 A1* | 5/2014 | Gollub | G06F 11/1004 |
| | | | 714/48 |
| 2015/0100852 A1* | 4/2015 | Huang | G06F 11/1068 |
| | | | 714/773 |
| 2015/0205665 A1* | 7/2015 | Kuo | G06F 11/1048 |
| | | | 714/773 |

OTHER PUBLICATIONS

Michael F. Fee et al., Pending U.S. Appl. No. 14/824,264 entitled "Dynamic Partial Blocking of a Cache ECC Bypass" filed with the U.S. Patent and Trademark Office on Aug. 12, 2015.

Yoon, Doe Hyun et al., "Memory Mapped ECC: Low-Cost Error Protection for Last Level Caches," ACM SIGARCH Computer Architecture News, vol. 37, No. 3, pp. 116-127, ACM, 2009, 12 pages.

\* cited by examiner

DYNAMIC PARTIAL BLOCKING OF A CACHE ECC BYPASS

BACKGROUND

The present invention relates generally to a cache memory of a computer system, and more specifically, to dynamic partial blocking of a cache error-correcting code (ECC) checking and correcting bypass.

A cache is a memory component of a computer system that transparently retains data elements (or simply data) so that future requests for any retained data can be served faster. A data element that is stored within a cache corresponds to a pre-defined storage location within a computer memory system. Such data element might have a value that has recently been computed or be a duplicate copy of a data value that is stored in the pre-defined storage location. If requested data is contained in the cache, this is referred to as a cache hit and the request can be served by simply reading the cache. If the requested data is not contained in the cache, this is referred to as a cache miss and the data has to be fetched from system memory (or other storage medium) which is not necessarily close to the requester, and thus is comparatively slower when compared to accessing data in a cache. In general, the greater the number of requests that can be served from the cache, the faster the overall system performance becomes.

To ensure the validity of data in the cache, the data can be checked for errors. ECC bits are often kept with data in caches in order to protect against both soft and hard failures. Performing ECC processing in-line with every cache access comes with a latency penalty when returning data to the requester.

SUMMARY

Embodiments include a method, system, and computer program product for dynamic partial blocking of a cache error-correcting code (ECC) checking and correcting bypass. An aspect includes receiving a fetch request from a requestor for a data block. The receiving is at a cache memory system that includes a cache memory that is partitioned into a plurality of cache data ways including a cache data way that contains the data block. The data block is fetched from the cache memory. It is determined whether the in-line ECC checking and correcting should be bypassed. The determining is based on a bypass indicator corresponding to the cache data way. Based on determining that in-line ECC checking and correcting should be bypassed, the fetched data block is returned to the requestor and an ECC process is performed for the fetched data block subsequent to returning the fetched data block to the requestor. Based on determining that in-line ECC checking and correcting should not be bypassed, the ECC process is performed for the fetched data block and the fetched data block is returned to the requestor subsequent to performing the ECC process.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

Embodiments described herein can provide error correction and detection for data stored in a cache, while minimizing the latency impact of error-correcting code (ECC) checking and correcting circuitry in a cache fetch process, by providing dynamic partial blocking of an ECC bypass. In an embodiment, the cache is partitioned and only the data fetched from a partition where an error(s) was detected in a previous access to the partition is routed through ECC circuitry prior to returning the fetched data to the requestor. In contrast, data fetched from a partition in the cache where an error(s) has not been previously detected can be routed directly to the requestor, thus bypassing the ECC circuitry and the latency associated with performing ECC.

The cache can be broken into partitions that are large enough to adequately cover expected potential failure modes, but small enough that they cover as little of the cache as possible. In addition, the number of pipeline compares that must be completed to determine if the "marked" portion of the cache is being accessed can also be minimized. When an error is detected in the cache, the associated cache partition is prevented from using the ECC bypass data return path in the future and is forced to go through ECC check and correct (with latency penalty). By keeping the cache partition as small as possible the performance impact of blocking bypasses from this partition can be minimized. In an embodiment, a partition corresponds to a way or compartment in a cache directory.

In an embodiment, where a partition corresponds to a way, each partition is associated with a way ECC bypass vector bit within a vector. Thus, the way ECC bypass vector bit is a bypass indicator for its corresponding way. As errors are detected in the cache for any access, the associated way ECC bypass vector bit within the vector is deactivated. When a core fetch cache access enters the pipeline, the associated way ECC bypass vector bit in the vector is looked up using the appropriate way bits that define the partitions. If the way ECC bypass vector bit is deactivated on a core fetch hit, the access is forced through the ECC circuitry to perform ECC checking and correcting. If the way ECC bypass vector bit is activated on the core fetch hit, the access is allowed to bypass the ECC circuitry and thus, the ECC checking and correcting.

Figure 1:
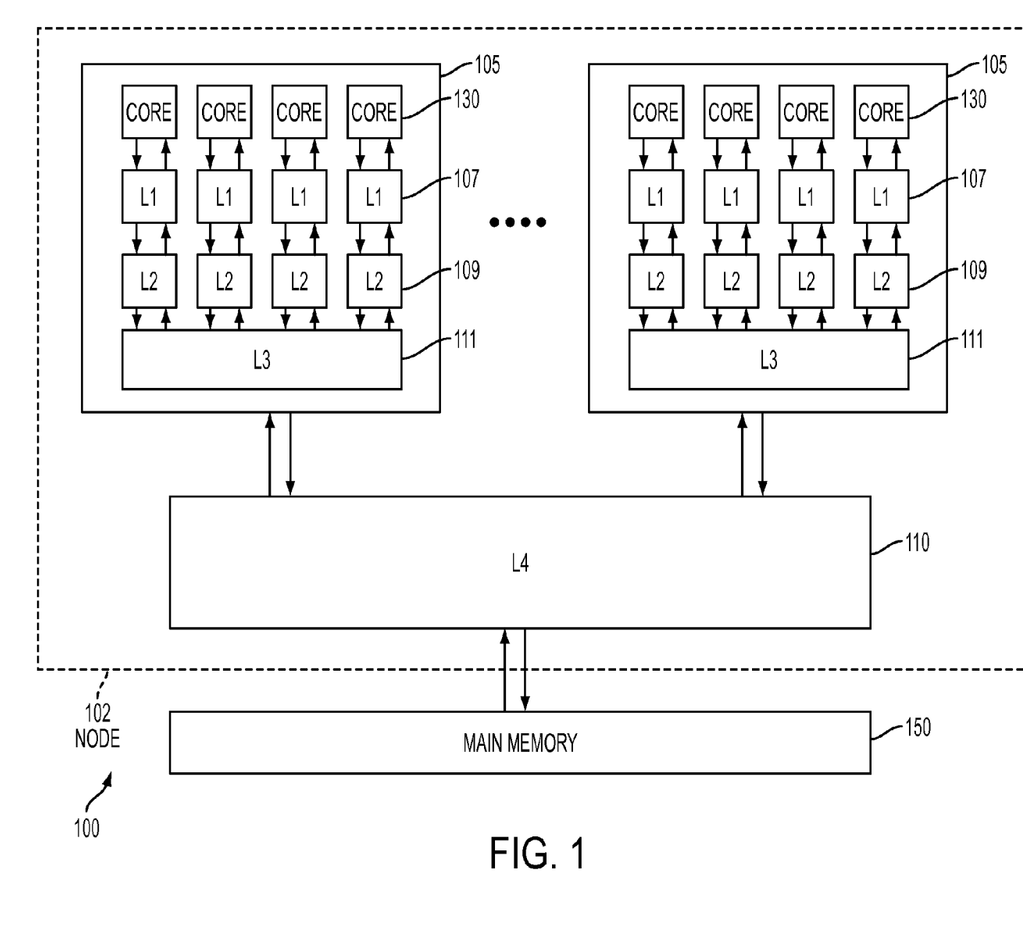
FIG. 1 depicts a computer system for dynamic partial blocking of cache error-correcting code (ECC) checking and correcting bypass in accordance with an embodiment.

Turning now to FIG. 1, an example of a computing system 100 is generally shown in accordance with an embodiment. The system includes one or more nodes 102. In one embodiment, the computing system 100 may include eight nodes 102. In the computing system 100, multiple nodes 102 may be operatively connected to one another for communicating such as making and responding to requests, as is understood by one skilled in the art.

Each node 102 includes one or more central processors 105. In one embodiment, each node 102 includes three central processors 105. The central processors 105 include one or more cores 130 that perform the reading and executing of instructions. In one embodiment, one or more of the central processors 105 include eight cores 130. Each core 130 is operatively coupled to its own level one (L1) cache 107 and level two (L2) cache 109. The L1 caches 107 are physically closest to the cores 130 and the L2 caches 109 are coupled to the L1 caches 107. In the embodiment shown in FIG. 1, each L2 cache 109 in each central processor 105 is coupled to a single level three (L3) cache 111. In this manner, the L3 cache 111 is shared by multiple L2 caches 107 and accessible by each of the cores 130.

The node 102 shown in FIG. 1 also includes one or more level four (L4) caches 110. The L4 caches 110 are operatively coupled to two or more central processors 105. In this manner, the L4 caches 110 are shared by multiple L3 caches 111 and accessible by any of the cores 130 on any of the central processors 105. The computing system 100 may also include main memory 150 operatively coupled to the L4 caches 110.

In one embodiment, the L3 caches 111 and L4 cache 110 are formed of embedded dynamic random access memory (DRAM) which is referred to as eDRAM. It should be understood that any other types of suitable memory such as DRAM can be utilized. In one embodiment, the L2 caches 109 can be formed of static random access memory (SRAM).

In one embodiment, each individual central processor 105 is fabricated on its own separate chip, which includes the L1, L2, and L3 caches, and the L4 cache 110 is fabricated on its own separate chip. As understood by a skilled artisan, fabrication of chips including integrated circuits, wires, metal layers, semiconductor (and/or other material) components, etc., can be formed via lithography and other techniques. The fabrication process can include various deposition techniques including physical vapor deposition (PVD), chemical vapor deposition (CVD), electrochemical deposition (ECD), molecular beam epitaxy (MBE), and atomic layer deposition (ALD) among others.

In an exemplary embodiment, the L1 caches 107 can store between 64 and 128 kilobytes (KBs), the L2 caches 109 can store 2 megabytes (MBs), the L3 cache can store 64 MB and the L4 cache 110 can store 384 MB. It should be understood that these are just examples, and that other sizes can be utilized. In FIG. 1, four different levels of caches (L1, L2, L3 and L4) are shown. Such an organization of caches is exemplary only and the teachings herein may be applied to any cache memory system having any number of cache levels.

Figure 2:
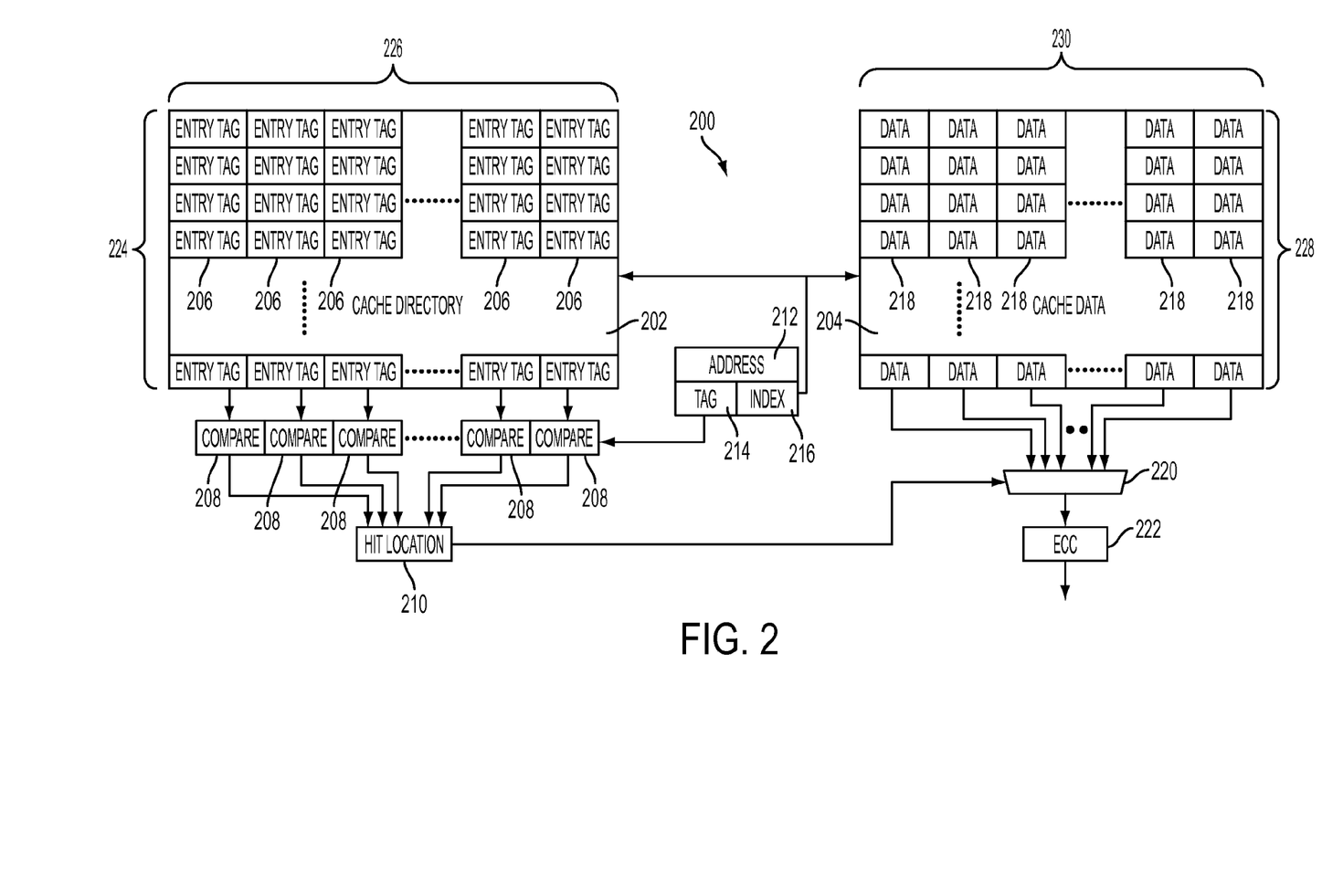
FIG. 2 depicts a contemporary cache system that includes ECC.

Turning now to FIG. 2, contemporary cache system that includes ECC is generally shown. As shown in FIG. 2, a set associative cache system 200 is made up of a cache directory 202 and cache data 204. The cache data 204 is made up of cache data blocks 218, arranged in cache data sets 228 and cache data ways 230. As used herein, the term "cache data set" refers to a group of cache data blocks 218 that make up a horizontal row in the cache data 204, and the term "cache data way" refers to a group of cache data blocks 218 that make up a vertical column in the cache data 204. The cache system 200 shown in FIG. 2 also includes a cache directory 202 which is made up of entry tags 206, arranged in entry tag sets 224 and entry tag ways 226. As used herein, the terms "entry tag set" or "set of entry tags" refers to a group of entry tags 206 that make up a horizontal row in the cache directory 202, and the term "entry tag way" refers to a group of entry tags 206 that make up a vertical column in the cache directory 202.

Entry tags 206 in the cache directory 202 correspond to data blocks 218 in the cache data 204. When data is requested from the cache system 200, the data's address 212 is broken into a tag 214 and an index 216. The index 216 is used to select a set of entry tags 206 from the cache directory 202. Each entry tag 206 contains both the tag and valid state of the corresponding data block 218 (or data entry) in the cache data 204. Each of the entry tags 206 in the set have their tag compared 208 with the tag 214 of the requested address 212. The results of these compares and valid state are assembled into the hit location 210 which indicates to the cache data 204 which cache data way 230 contains the requested data. The index 216 is also used to access the corresponding set of data blocks 218 in the cache data 204. The hit location 210 can then be used with a multiplexing structure 220 to select the desired data from its cache data way 230 location in the cache data 204. The data is then sent through ECC 222 to perform error checking and correcting before being returned to the requester.

Figure 3:
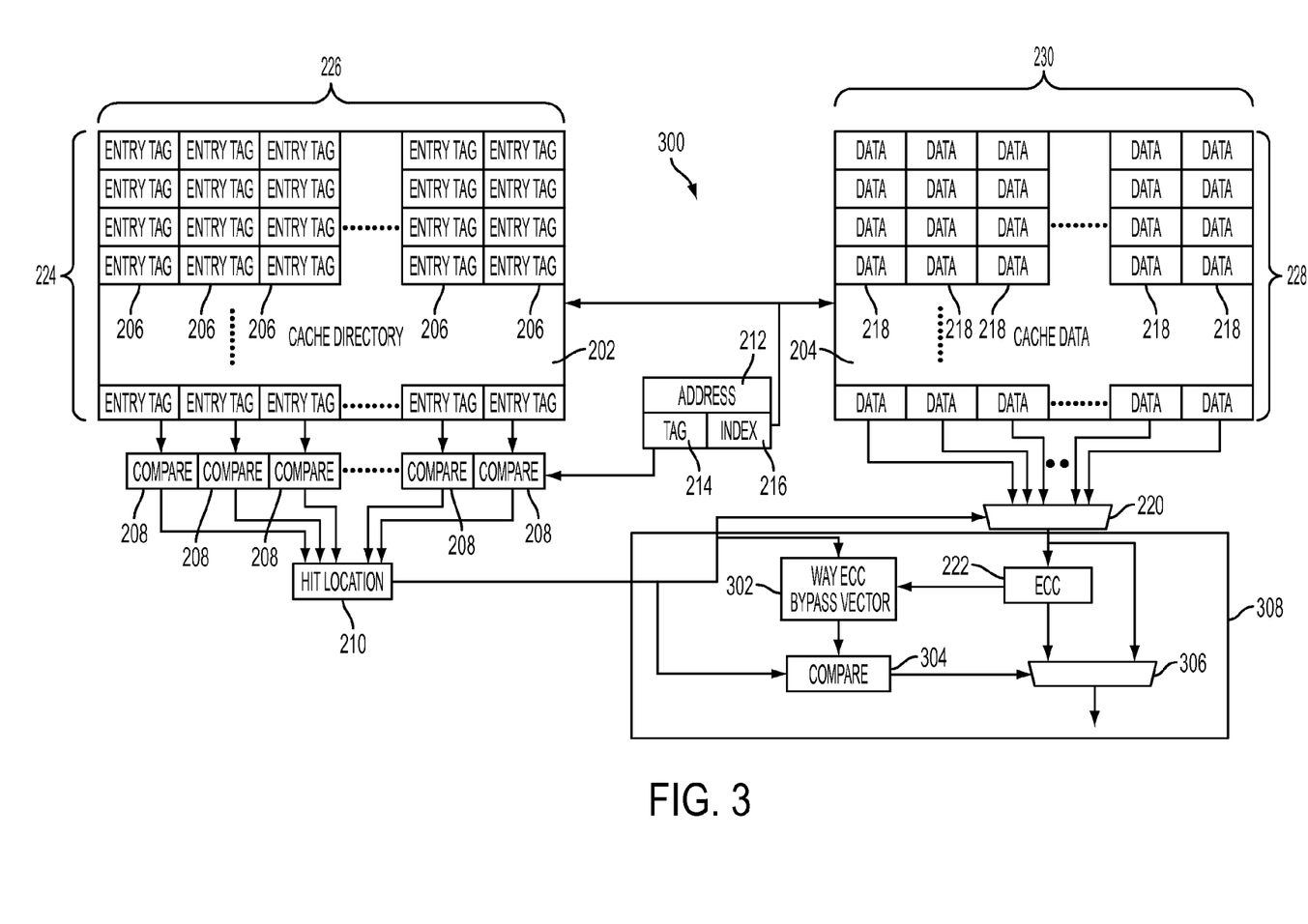
FIG. 3 depicts a cache system that includes dynamic partial blocking of a cache ECC bypass in accordance with an embodiment.

Turning now to FIG. 3, a cache system 300 that includes dynamic partial blocking of ECC bypass logic 308 is generally shown in accordance with an embodiment. The cache system 300 shown in FIG. 3 includes dynamic partial blocking of ECC bypass logic 308 but is otherwise similar to the cache system 200 shown in FIG. 2. As shown in FIG. 3, when the hit location 210 is generated, the hit location 210 is still used with the multiplexing structure 220 to select the desired data from its cache data way 230 location in the cache data 204. In addition, the hit location 210 is forwarded to the way ECC bypass vector 302. If an error is detected while the ECC 222 is being performed, the way ECC bypass vector 302 is updated to reflect that an error was detected in the cache data way 230 being accessed. In an embodiment, the way ECC bypass vector 302 includes one bit for each cache data way 230, with each bit indicating whether ECC processing should be performed for data fetched from its corresponding cache data way 230.

As new requests access the cache data 204 in the cache system 300, they perform look ups in the cache directory 202 and generate hit locations 210. These hit locations 210 are then compared 304 with their corresponding bits in the way ECC bypass vector 302. If the bit corresponding to the cache data way 230 of the hit location 210 is activated (i.e., an error has not been detected in a data block 218 in cache data way 230 of the hit location 210), then the multiplexor 306 is used to select the data path that bypasses the in-line ECC 222. As used herein, the term "in-line ECC" refers to performing the ECC process prior to returning fetched data to the requestor. The path that bypasses the in-line ECC checking and correcting takes less time and returns the requested data with less latency. If, on the other hand, the bit corresponding to the cache data way 230 of the hit location 210 is deactivated, then the multiplexor 306 selects the path that performs the in-line ECC 222 on the retrieved data that is associated with address 212.

In this manner, only the fetched data blocks 218 associated with a cache data way 230 that has had an error in the past will be routed through the ECC 222. In an embodiment, the bits in the way ECC bypass vector 302 can also be set based on factors such as, but not limited to: age of the memory device, type of the memory device, and/or type of application accessing the cache data. Embodiments allow the decision of whether or not to perform in-line ECC checking and correcting on fetched data to be based on the way that the data is fetched from.

The system shown in FIG. 3 is one embodiment that can be implemented to perform the dynamic partial blocking of a cache ECC bypass described herein. Other embodiments can include, but are not limited to: creating groups of ways together and bypassing based on errors being seen in the grouping; creating groups of sets and ways together and determining the bypassing based on the groupings; varying where the multiplexing and ECC checking and correcting occur; and/or the address scheme may be altered to include offsets to which bits in the address are used as tag and index.

Figure 4:
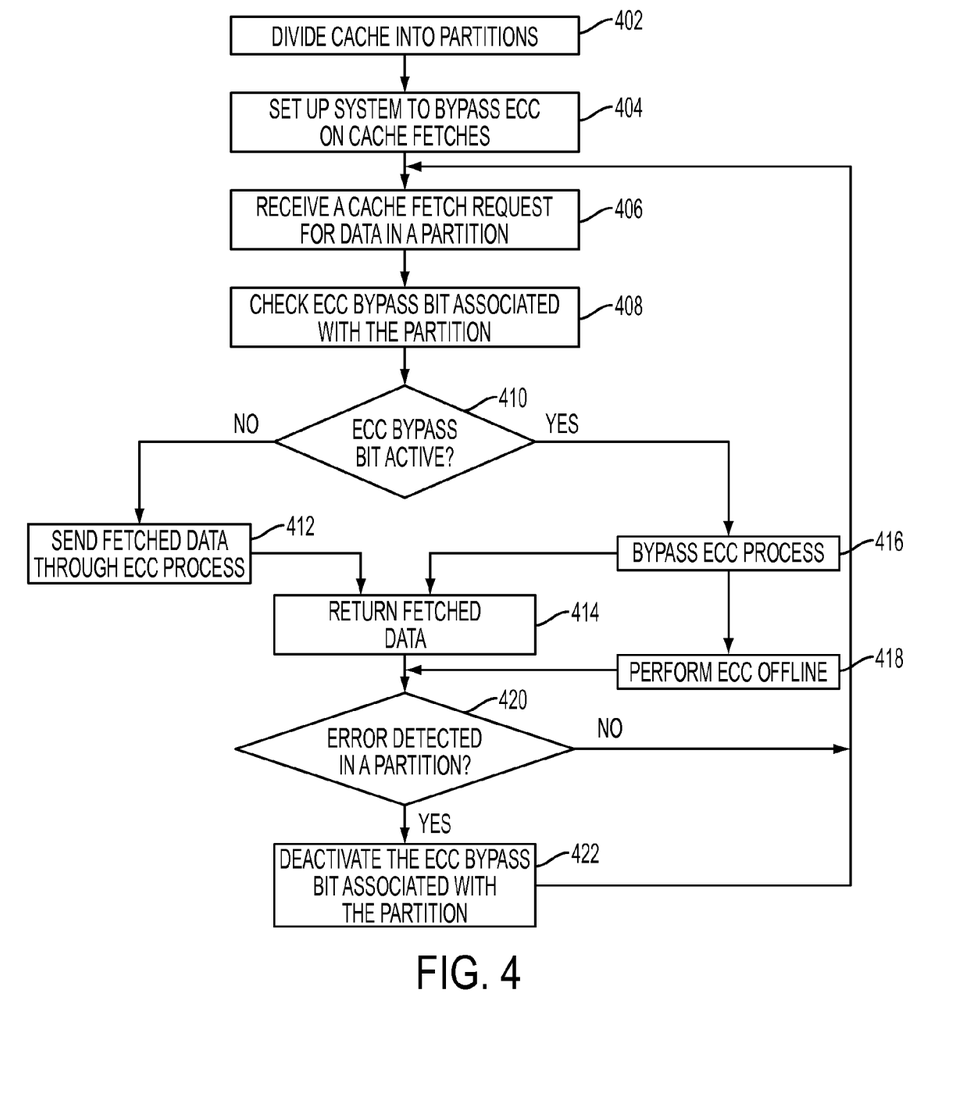
FIG. 4 depicts a process flow for dynamic partial blocking of a cache ECC bypass in accordance with an embodiment.

Turning now to FIG. 4, a process flow for dynamic partial blocking of a cache ECC bypass is generally shown in accordance with an embodiment. The processing shown in FIG. 4 can be performed by the cache system 300 shown in FIG. 3. At block 402, a cache memory is divided into partitions such that, for example, the expected failure modes are included within a partition. In an embodiment, each partition corresponds to a way in a cache directory/cache memory. At block 404, the system is set up, or initialized, to bypass the in-line ECC checking and correcting on cache fetches. When the partition is a way, block 404 can be performed by setting all of the bits in the way ECC bypass vector 302 shown in FIG. 3 to active. At block 406, a cache fetch is received, by the cache system, for data in a partition; and at block 408, the ECC bypass bit corresponding to the partition being accessed is checked in the ECC bypass vector. At block 410, it is determined whether the ECC bypass bit is active and processing continues at block 416 based on determining that the ECC bypass bit is active. At block 416, the in-line ECC checking and correcting is bypassed and processing continues at both blocks 418 to perform the ECC processing off-line (subsequent to or in parallel with returning the fetched data) and at block 414 to return the fetched data to the requestor (e.g. a core). If it is determined at block 410, that the ECC bypass bit is not active for the partition being accessed, then processing continues at block 412 with the fetched data being sent through the in-line ECC checking and correcting before being returned to the requestor at block 414.

Processing continues, from blocks 414 and 418, at block 420 where it is determined whether an error was detected in the fetched data, either by the in-line ECC at block 412 or by the off-line ECC at block 418. If an error was detected, then block 422 is performed and the ECC bypass bit in the ECC bypass vector corresponding to the partition where the fetched data was located is deactivated. By deactivating the ECC bypass bit for the partition, subsequent data that is fetched from the partition will be sent through the in-line ECC checking and correcting process. In this manner, the ECC bypass bit for the partition can be updated based on a result of the ECC process being applied to data fetched from the partition. A result of the ECC process can include, but is not limited to: one or more errors are detected, no errors are detected, more than a threshold number of errors are detected, and less than a threshold number of errors are detected. Processing continues at block 406. If no error was detected, as determined at block 420, then processing continues at block 406.

In an embodiment, processing continues at block 408 after block 422 is completed in order to re-fetch the data when in-line ECC checking and correcting was not performed on the data the first time that it was fetched (e.g., the processing through FIG. 4 included blocks 416, 418, 420 and 422). In this manner, the fetched data returned at block 414 can be processed by the ECC, and thus contain corrected fetched data.

Embodiments described herein provide a method for dynamically and partially blocking cache ECC bypass by dividing the cache into partitions such that the expected failure modes are includes in the partitions (e.g., a partition includes cache locations that may be likely to fail as a unit). To maximize performance, the cache system can be initially set up, or initialized to always bypass the in-line ECC checking and correcting and when/if an error is detected with a partition, the associated ECC bypass bit is deactivated. As cache accesses enter the pipeline, the ECC bypass bits are compared with the corresponding data block's way bits to determine if the access is in a portion of the cache that is marked (i.e., where the ECC bypass bit is deactivated). If the ECC bypass bit is deactivated, then the fetched data is forced through an in-line ECC checking and correcting process. If the ECC bypass bit is active, then ECC is not checked/corrected in-line and the data is returned to the requestor without penalty. The ECC checking and correcting is performed off-line, and if it is later determined that the fetched data contained errors, the access can be retried and the ECC bypass bit deactivated so that future access to that partition are corrected.

In the example shown herein, a partition corresponds to a "way" in a cache directory 202/cache data 204. Other partitions can also be implemented by embodiments such as, but not limited to: each set is partition, a subset of a way or set is a partition, an intersection of a subset of the ways and sets form a partition, and/or multiple sets or ways form a partition.

Embodiments described herein can be used by any cache level, such as, but not limited to L1, L2, L3, and L4.

Technical effects and benefits include the ability to bypass ECC for at least a subset of cache fetches, which can lead to improved cache performance due to a decrease in the amount of time that it takes to fetch cache data.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
a core processor and a cache memory system, the system configured to perform a method comprising:
receiving a fetch request from the core processor for a data block, the receiving at the cache memory system, the cache memory system including a cache memory that is partitioned into a plurality of cache data ways including a cache data way that contains the data block;
fetching the data block from the cache memory;
determining whether to bypass in-line error-correcting code (ECC) checking and correcting, the determining based on a bypass indicator corresponding to the cache data way;
based on determining that the in-line ECC checking and correcting should be bypassed, returning the fetched data block to the requestor and performing an ECC process for the fetched data block subsequent to returning the fetched data block to the core processor;
based on determining that the in-line ECC checking and correcting should not be bypassed, performing the ECC process for the fetched data block and returning the fetched data block to the core processor subsequent to performing the ECC process; and based on both the ECC process detecting errors in the fetched data block and on determining that the in-line ECC checking and correcting should not bypassed, updating the bypass indicator corresponding to the cache data way to indicate that the in-line ECC checking and correcting should not be bypassed and re-fetching the data block from the cache memory.

2. The system of claim 1, wherein the method further comprises updating the bypass indicator corresponding to the cache data way based on a result of the ECC process.

3. The system of claim 2, wherein the bypass indicator corresponding to the cache data way is updated to indicate that in-line ECC checking and correcting should not be performed based on the ECC process not detecting any errors in the fetched data block.

4. The system of claim 2, wherein the bypass indicator corresponding to the cache data way is updated to indicate that in-line ECC checking and correcting should be performed based on the ECC process detecting at least one error in the fetched data block.

5. The system of claim 1, wherein the bypass indicator corresponding to the cache data way includes a bit that is located in a vector that includes bits corresponding to each of the plurality of cache data ways.

6. The system of claim 1, wherein the bypass indicator corresponding to the cache data way is initialized to indicate that the in-line ECC checking and correcting should be bypassed.

7. A computer program product comprising:

a computer readable storage medium having program instructions embodied therewith, the program instructions readable by a processing circuit to cause the processing circuit to perform a method comprising:

receiving a fetch request from a requestor for a data block, the receiving at a cache memory system that includes a cache memory that is partitioned into a plurality of cache data ways including a cache data way that contains the data block;

fetching the data block from the cache memory;

determining whether to bypass in-line error-correcting code (ECC) checking and correcting, the determining based on a bypass indicator corresponding to the cache data way;

based on determining that the in-line ECC checking and correcting should be bypassed, returning the fetched data block to the requestor and performing an ECC process for the fetched data block subsequent to returning the fetched data block to the requestor;

based on determining that the in-line ECC checking and correcting should not be bypassed, performing the ECC process for the fetched data block and returning the fetched data block to the requestor subsequent to performing the ECC process; and based on both the ECC process detecting errors in the fetched data block and on determining that the in-line ECC checking and correcting should not bypassed, updating the bypass indicator corresponding to the cache data way to indicate that the in-line ECC checking and correcting should not be bypassed and re-fetching the data block from the cache memory.

8. The computer program product of claim 7, wherein the method further comprises updating the bypass indicator corresponding to the cache data way based on a result of the ECC process.

9. The computer program product of claim 8, wherein one of:

the bypass indicator corresponding to the cache data way is updated to indicate that in-line ECC checking and correcting should not be performed based on the ECC process not detecting any errors in the fetched data block; and the bypass indicator corresponding to the cache data way is updated to indicate that in-line ECC checking and correcting should be performed based on the ECC process detecting at least one error in the fetched data block.

10. The computer program product of claim 7, wherein the bypass indicator corresponding to the cache data way includes a bit that is located in a vector that includes bits corresponding to each of the plurality of cache data ways.

11. The computer program product of claim 7, wherein the bypass indicator corresponding to the cache data way is initialized to indicate that the in-line ECC checking and correcting should be bypassed.

\* \* \* \* \*